(12) United States Patent
Kuku et al.

(10) Patent No.: US 11,465,908 B1
(45) Date of Patent: Oct. 11, 2022

(54) GENERATION OF AN ALKALINE LIQUID AND FORMING A CONTINUOUS GENERATION ALKALINE LIQUID LOOP

(71) Applicant: GLOBAL CARBON EMISSIONS SOLUTIONS LLC, Gilbert, AZ (US)

(72) Inventors: Lai O. Kuku, Gilbert, AZ (US); Gypsy M. Biller, Chandler, AZ (US); Michael P. Wounderberg, Phoenix, AZ (US); Kyle J. Koleber, Phoenix, AZ (US); Girish N Raghunathan, Tempe, AZ (US)

(73) Assignee: Global Carbon Emissions Solutions, LLC, Gilbert, AZ (US)

( * ) Notice: Subject to any disclaimer, the term of this patent is extended or adjusted under 35 U.S.C. 154(b) by 0 days.

(21) Appl. No.: 17/403,711

(22) Filed: Aug. 16, 2021

Related U.S. Application Data

(60) Provisional application No. 63/189,990, filed on May 18, 2021.

(51) Int. Cl.

| | | |
|---|---|---|
| *C01B 25/30* | (2006.01) | |
| *C01F 11/18* | (2006.01) | |
| *B01D 53/14* | (2006.01) | |
| *B01D 53/50* | (2006.01) | |
| *B01D 53/56* | (2006.01) | |
| *B01D 53/62* | (2006.01) | |
| *B01D 53/78* | (2006.01) | |
| *B01D 53/96* | (2006.01) | |

(52) U.S. Cl.
CPC ........ *C01F 11/181* (2013.01); *B01D 53/1425* (2013.01); *B01D 53/1475* (2013.01); *B01D 53/1481* (2013.01); *B01D 53/1493* (2013.01); *B01D 53/502* (2013.01); *B01D 53/56* (2013.01); *B01D 53/62* (2013.01); *B01D 53/78* (2013.01); *B01D 53/96* (2013.01); *C01B 25/301* (2013.01); *B01D 2251/304* (2013.01); *B01D 2251/604* (2013.01); *B01D 2257/302* (2013.01); *B01D 2257/40* (2013.01); *B01D 2257/504* (2013.01); *B01D 2258/0283* (2013.01)

(58) Field of Classification Search
CPC ............... C01F 11/181; B01D 53/1493; B01D 53/1481; B01D 53/1475; B01D 53/1425; B01D 53/502; B01D 53/56; B01D 53/62; B01D 53/78; B01D 53/96; B01D 2258/0283; B01D 2251/304; B01D 2251/604; B01D 2257/302; B01D 2257/40; B01D 2257/504; C01B 25/301
See application file for complete search history.

(56) References Cited

FOREIGN PATENT DOCUMENTS

| CN | 106 512 678 A | * | 3/2017 | ................ C02F 1/58 |
| WO | WO 2020 016 012 A1 | * | 1/2020 | ............. B01D 47/06 |

* cited by examiner

*Primary Examiner* — Timothy C Vanoy

(57) ABSTRACT

A process is provided using a concentrated sodium bicarbonate solution as a solubilizer mixed with a calcium hydroxide to chemically produce an insoluble calcium carbonate and produce an alkaline liquid solution, then passing the alkaline liquid solution through detrimental gases in a scrubber to produce an enhanced sodium bicarbonate which regenerates the sodium bicarbonate thus creating a continuous closed loop. The process can also produce a sodium phosphate (trisodium phosphate) by mixing the alkaline liquid solution with a phosphoric acid.

9 Claims, 1 Drawing Sheet

GENERATION OF AN ALKALINE LIQUID AND FORMING A CONTINUOUS GENERATION ALKALINE LIQUID LOOP

TECHNICAL FIELD

The subject design relates generally to a process for chemically mixing a blended solution with a solubilizer to produce an ionic solid for commercial use and to produce an alkaline liquid solution. The alkaline liquid solution is passed through exhaust gases from a power plant to chemically produce a solubilizer solution that serves to regenerate the solubilizer used above in order to create a continuous loop. The process also mixes the alkaline liquid solution with a phosphorus acid to produce a sodium phosphate solution.

BACKGROUND

Solubilizers are known for use in chemical processes and are used to increase the solubility of various solutions in water. U.S. Pat. No. 9,833,739 issued Dec. 5, 2017 to Kuku et al. and teaches the use of glycerol as a solubilizer for calcium hydroxide. While glycerol is effective as a solubilizer, the effect is limited by the concentration of the reactive mixture from 40-60%, above which there is a diminished reaction. In addition, only 11-16% g/l of solubility can be achieved with glycerol and other solubilizers including sucrose. For a better solution with more hydroxyl ions that will increase its efficiency, a more effective solubilizer is needed for calcium hydroxide to be a more viable capture medium for several gases. U.S. Pat. No. 8,119,091 issued Feb. 21, 2012 to Keith et al. teaches a multi-step process for carbon dioxide absorption from atmospheric air with the use of an aqueous solution of sodium hydroxide to react with the carbon dioxide to form sodium carbonate. The sodium carbonate is then subject to causticization and the sodium carbonate is reacted with sodium tri-titanate to extract the carbon dioxide gas and the sodium penta-titanate. Keith et al. does not teach a process for producing an alkaline liquid solution. It is also desirable to provide a process that can be run on a continuous basis to continuously regenerate the used solubilizer.

SUMMARY OF THE INVENTION

According to the present process, blended solution is mixed with a solubilizer solution, in a mixing tank to create a chemical reaction that produces an ionic solid for commercial uses and an alkaline liquid solution that is chemically mixed with a phosphoric acid to produce an ionic solid sodium phosphate for commercial uses. Additionally, the present process provides using a concentrated sodium bicarbonate solution as the solubilizer to be mixed with the calcium hydroxide in the mixing tank to produce an alkaline liquid sodium hydroxide solution. This sodium hydroxide solution is passed through a scrubber which has exhaust flue gases flowing therethrough from a power plant. As the sodium hydroxide solution passes through the flue gases the sodium hydroxide solution chemically interacts with the flue gasses to convert the sodium hydroxide solution to an enhanced sodium bicarbonate solution. The enhanced sodium bicarbonate solution from the scrubber is passed to the source of sodium bicarbonate tank and becomes the continuous solubilizer source to mix with the calcium hydroxide in the mixing tank. This forms a continuous regeneration loop for the process.

From a review of the above noted prior art, none of the prior art teaches or make obvious the concepts as set forth herein. Likewise, in view of the high costs set forth above for previous processes, it is desirable to have a process that overcomes the above problems and shortcomings.

Other objects, features, and advantages of the subject design will become more apparent from the following detailed description of the following embodiments and certain modifications thereof when taken together with the accompanying drawings.

DETAILED DESCRIPTION

Figure 1:
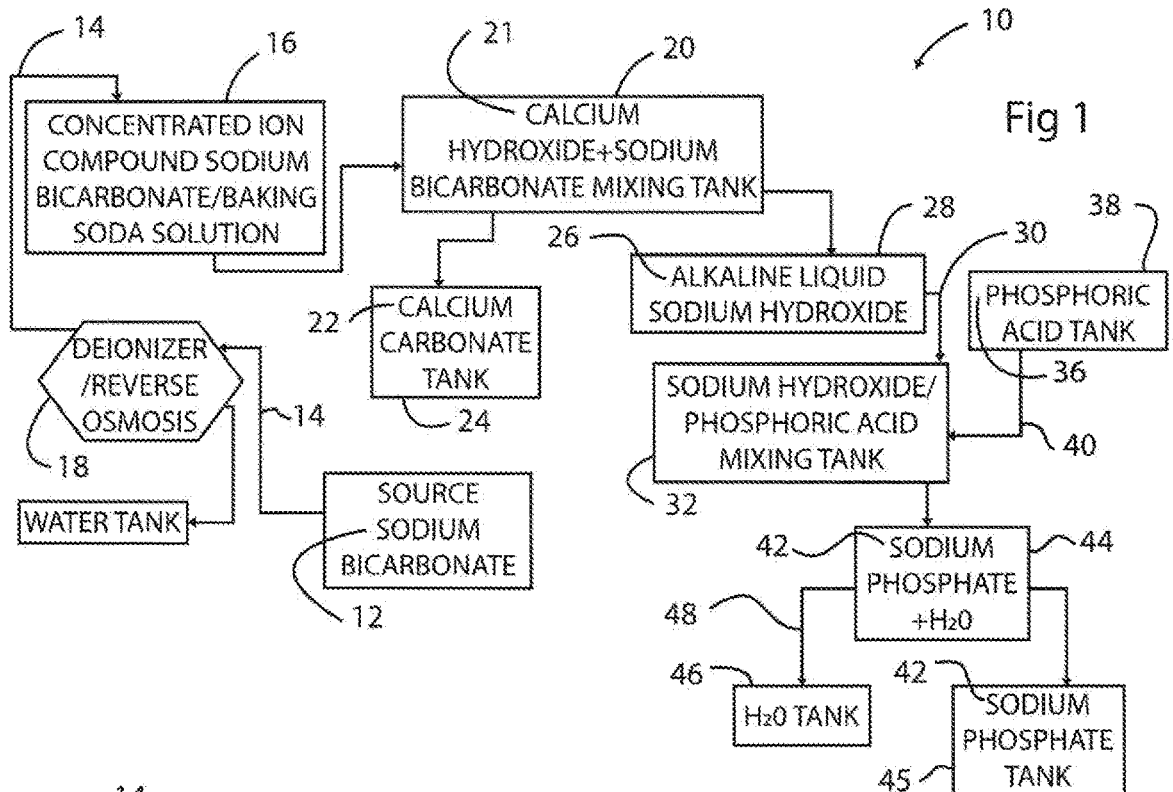
FIG. 1 is a partial flow chart and a partial diagrammatic representation of an embodiment of the subject process.

Referring to FIG. 1, a process 10 is provided. The process 10 includes a solubilizer, such as for example, a source of sodium bicarbonate solution 12 that is in fluid communication, through a line 14, with a concentrated ion sodium bicarbonate solution tank 16. The commercially purchased sodium bicarbonate solution 12 may or may not be concentrated. Consequently, it may be necessary to enhance its quality of purity. If the quality of the purchased sodium bicarbonate solution 12 qualifies as concentrated, then the concentrated sodium bicarbonate solution 12 is selectively directed around a deionizer (reverse osmosis)18 or a demineralization process (an electrochemical process) and passed directly to the concentrated ion sodium bicarbonate solution tank 16. It should be understood that either one of the reverse osmosis 18 or the demineralization process could be used herein without departing from the essence of the subject process 10. It is also understood that both the deionizer 18 and the electrochemical process produces the same result, that is, to remove substantially all of the salts from the bicarbonate solution 26. However, if the concentration is low, the sodium bicarbonate solution 16 from the source 12 is passed through the deionizer 18/demineralization process where the effective quality is enhanced by removing water and other impurities. After improving the quality of the sodium bicarbonate solution 12, it is passed on to the concentrated ion sodium bicarbonate solution tank 16.

The concentrated sodium bicarbonate solution 12 is passed on to a mixing tank 20 where the concentrated sodium bicarbonate solution 12 is chemically mixed with a calcium hydroxide+water 21. From the chemical reaction in the mixing tank 20, an alkaline sodium hydroxide solution 26 and an ionic solid 22 (calcium carbonete} are generated. The calcium carbonate 22 is drawn off and stored in a calcium carbonate tank 24. The alkaline liquid sodium hydroxide 26 is stored in a sodium hydroxide tank 28. The process further includes delivering the alkaline sodium hydroxide solution 26 from the sodium hydroxide tank 28 through a line 30, to another mixing tank 32. Phosphoric acid 36 stored in a tank 38 is delivered to the mixing tank 32 through a line 40. The phosphoric acid 36 chemically mixes with the alkaline liquid sodium hydroxide solution 26 and the resulting solution is a sodium phosphate 42 and water. The sodium phosphate 42 is separated from the water and passed to a sodium phosphate tank 45. The remaining water is passed to the water tank 46 through a line 48.

Figure 2:
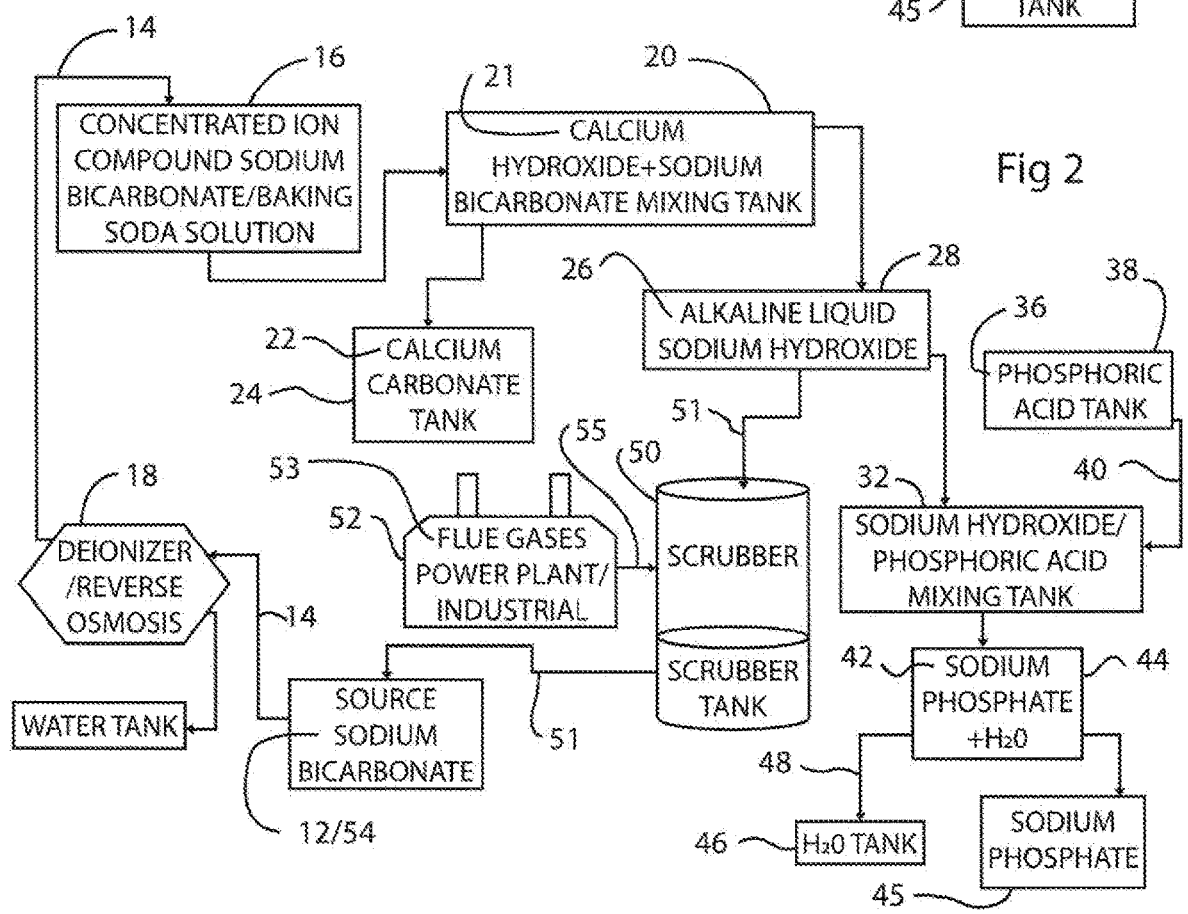
FIG. 2 is a partial flow chart and a partial diagrammatic representation of another embodiment of the subject process.

Referring to the embodiment of FIG. 2, as compared to FIG. 1, like elements have like element numbers; and In the embodiment of FIG. 2, a scrubber 50 is fluidly disposed between the sodium hydroxide tank 28 and the source of sodium bicarbonate tank 12 by a line 51. The cleaning flow of alkaline liquid sodium hydroxide 26 passes through the scrubber 50. Likewise, a power plant 52 is provided and exhaust gases 53 from the power plant 52 is directed through a line 55 to the wet scrubber 50 and through the flow of alkaline liquid sodium hydroxide 26 within the scrubber 50. As the exhaust gases 53 from the power plant 52 passes through the flow of alkaline liquid sodium hydroxide 26, carbon dioxide and other detrimental gases are captured or removed by the flow of alkaline liquid sodium hydroxide 26. The exhaust gases 53 chemically react with the alkaline liquid sodium hydroxide 26 to produce a sodium bicarbonate solution 54. The new sodium bicarbonate solution 54 is directed to the source of sodium bicarbonate tank 12 and becomes the source of sodium bicarbonate solution 12/54 for the process 10. With use of the newly produced sodium bicarbonate solution 54 as the source of the sodium bicarbonate, a continuous loop has been created for the process 10. The loop begins at the scrubber 50 where the new sodium bicarbonate solution 54 is created. The new sodium bicarbonate solution 12/54, in the tank is directed to the deionizer 18/demineralization process where, depending on the level of concentration, the flow will pass through the deionizer/electrochemical process 18 and be concentrated or bypassed thereby and go directly to the concentrated sodium bicarbonate tank 16. The concentrated sodium bicarbonate solution 12/54 from the tank 16 is chemically mixed with the calcium hydroxide solution 21 in the mixing tank 20. As shown in both FIG. 1 and FIG. 2, the output from the mixing tank 20 is an alkaline liquid sodium hydroxide 26. In FIG. 2, the line 51 extends from the alkaline sodium hydroxide tank 28 through the scrubber 50 to complete the continuous loop.

INDUSTRIAL APPLICABILITY

The subject process, as set forth in FIG. 1, clearly uses a sodium bicarbonate solution 12, concentrates the quality, if needed, and mixes it with the calcium hydroxide 21 in a mixing tank 20 to produce a chemical reaction. The chemical reaction in the mixing tank 20 produces an insoluble calcium carbonate 22 that is stored in a calcium carbonate tank 24 for subsequent commercial uses. The chemical reaction also produces an alkaline liquid sodium hydroxide 26 that is stored in the tank 28. The alkaline liquid sodium hydroxide 26 may be used to produce the sodium phosphate 42. This may be accomplished by chemically mixing the alkaline liquid sodium hydroxide 26 with a phosphoric acid 36 in the mixing tank 38. The chemical reaction produces the solution of sodium phosphate 42 (trisodium phosphate) and water that is stored in the sodium phosphate and water solution tank 44. This mixture could be used as a solubilizer of calcium hydroxide 21 or for other commercial uses. The sodium phosphate and water solution 42 could be dehydrated and the sodium phosphate stored in the tank 42 and the water bypasses to the water tank 46.

Referring to FIG. 2, with the addition of the scrubber 50 and the power plant 52, a regeneration loop is achieved, as follows. The process 10 may be started at different locations, but starting the process at the mixing tank 20 has been chosen. The calcium hydroxide solution 21 is chemically mixed with the concentrated sodium bicarbonate 12/54 in the mixing tank 20. The chemical reaction therein produces the insoluble solid calcium carbonate 22 which is drawn off and stored in the calcium carbonate tank 24 for commercial uses. The chemical reaction also produces the alkaline liquid sodium hydroxide 26 that is passed on to the alkaline liquid storage tank 28.

The alkaline liquid sodium hydroxide 26 in the storage tank 28 may be directed in two different directions. Depending on the volume of the alkaline liquid sodium hydroxide 26 produced, all may be passed on to the scrubber 50 for the generation of the sodium bicarbonate solution 12/54 or if the volume of the alkaline liquid sodium hydroxide 26 is higher than needed, a portion of the alkaline liquid sodium hydroxide 26 may be passed on to the sodium hydroxide and phosphoric acid mixing tank 32. From the chemical reaction in the mixing tank 32 between the alkaline liquid sodium hydroxide 26 and the phosphoric acid, the sodium phosphate 42 is produced.

The portion of the alkaline liquid sodium hydroxide 26 that is selectively passed on to the scrubber 50 and therethrough is subjected to the exhaust flue gases 53 coming from the power plant 52 through the line 55. The exhaust gases 53 from the power plant 52 normally contain, at least, $CO_2$ (carbon dioxide), $SO_2$ (sulfur), and $NO_x$ gases that are significantly reduced or totally removed. The high purity liquid sodium hydroxide 26 efficiently removes or captures these detrimental exhaust gases from the power plant 52. During the chemical reaction, the sulfur dioxides and the nitrogen oxides are removed, and the captured carbon dioxide is chemically transformed to the newly formed high purity sodium bicarbonate 54 ($NaHCO_3$). The newly formed high purity sodium bicarbonate 54 is directed to the source of sodium bicarbonate solution tank 12/54. As set forth above, if the concentration of the sodium bicarbonate solution 12/54 is low, the sodium carbonate solution 12/54 is directed through the deionizer/demineralization process 18 to make it more concentrated and then pass it on to the concentrated sodium bicarbonate tank 16. The continuous loop created continues to function to regenerate concentrated sodium bicarbonate 12/54 as needed.

Other embodiments, as well as certain variations and modification of the embodiments herein shown and described, will obviously occur to those skilled in the art upon becoming familiar with the underlying concept. It is to be understood, therefore, that the subject process, as claimed, may be practiced otherwise than specifically set forth above.

ELEMENT LIST 10. process
12. source of sodium bicarbonate
14. line
16. concentrated sodium bicarbonate tank
18. deionizer
20. mixing tank
21. calcium hydroxide
22. calcium carbonate
24. calcium carbonate tank
26. alkaline liquid sodium hydroxide
28. sodium hydroxide tank
30. line
32. mixing tank
36. phosphoric acid
38. phosphoric acid tank
40. line
42. sodium phosphate (trisodium phosphate)
44. sodium phosphate+water tank

45. sodium phosphate tank
46. water tank
48. line
50. scrubber
51. line
52. power plant
53. exhaust gases
54. sodium bicarbonate solution
55. line

What is claimed is:

1. A process comprising mixing a blended solution with a solubilizer to produce an ionic solid for commercial use and to produce an alkaline liquid solution, and
wherein the alkaline liquid solution is further chemically mixed with a phosphoric acid to produce a sodium phosphate.

2. The process of claim 1 wherein the solubilizer is a commercially available concentrated sodium bicarbonate and the blended solution is calcium hydroxide;
wherein the chemically produced ionic solid is calcium carbonate; and
wherein the alkaline liquid solution is an enriched alkaline sodium hydroxide.

3. The process of claim 2 further comprising a scrubber fluidly disposed between the enriched alkaline sodium hydroxide solution and the source of the sodium bicarbonate solution; and
directing the flue gases from the power plant through the enriched alkaline sodium hydroxide solution flowing through the scrubber.

4. The process of claim 3 wherein the enriched sodium hydroxide solution passing through the scrubber is chemically changed to a sodium bicarbonate solution.

5. The process of claim 4 wherein a continuous sodium bicarbonate solution regeneration loop is provided from the source of sodium bicarbonate solution to the mixing tank with the calcium hydroxide+water, to the alkaline sodium hydroxide solution tank, to the scrubber, and back to the source of sodium bicarbonate solution.

6. The process of claim 3 wherein the flue gases from the power plant contains carbon dioxide, sulfur dioxide, and nitrogen oxide, and
wherein the enriched alkaline sodium dioxide solution is effective to remove the sulfur dioxide and nitrogen oxide gases and capture the carbon dioxide gases; and
during the chemical reaction, chemically transforming the carbon dioxide gases to a newly created sodium bicarbonate solution that is directed to the source of sodium bicarbonate solution downstream of the scrubber.

7. The process of claim 1 wherein the chemically produced sodium phosphate is separated from the water and stored in the sodium phosphate tank and the water is passed to the pure water tank.

8. The process of claim 1 wherein the solubilizer is a commercially available sodium bicarbonate solution stored as a source of sodium bicarbonate;
wherein, to further enhance the concentration of the stored sodium bicarbonate, the sodium bicarbonate is selectively directed through a deionizer where additional water is drawn off and passed to a water tank; and
directing the further concentrated sodium bicarbonate solution as the solubilizer to be chemically mixed with the blended solution in the mixing tank.

9. The process of claim 8 wherein to further enhance the concentration of the stored sodium bicarbonate, the sodium bicarbonate is selectively directed through a demineralization process where addition water is drawn off and passed to a water tank; and
directing the further concentrated sodium bicarbonate solution as the solubilizer to be chemically mixed with the blended solution in the mixing tank.

* * * * *

UNITED STATES PATENT AND TRADEMARK OFFICE
CERTIFICATE OF CORRECTION

| | | |
|---|---|---|
| PATENT NO. | : 11,465,908 B1 | Page 1 of 1 |
| APPLICATION NO. | : 17/403711 | |
| DATED | : October 11, 2022 | |
| INVENTOR(S) | : Lai O. Kuku et al. | |

It is certified that error appears in the above-identified patent and that said Letters Patent is hereby corrected as shown below:

On the Title Page

Inventors item (72) Line 3 (Third Listed Inventor) delete "Wounderberg" and insert --Woudenberg--

Signed and Sealed this
Twenty-first Day of February, 2023

Katherine Kelly Vidal
*Director of the United States Patent and Trademark Office*